United States Patent [19]

White

[11] 3,995,515
[45] Dec. 7, 1976

[54] BAKERY PRODUCT SLICER
[75] Inventor: David Laverne White, Dallastown, Pa.
[73] Assignee: Alto Corporation, York, Pa.
[22] Filed: Nov. 28, 1975
[21] Appl. No.: 635,891
[52] U.S. Cl. .................................. 83/4; 83/418; 83/440; 83/441
[51] Int. Cl.² ...................... B26D 3/08; B26D 4/76
[58] Field of Search ............... 83/4, 418, 440, 441, 83/9, 732

[56] References Cited
UNITED STATES PATENTS

| | | | |
|---|---|---|---|
| 2,669,269 | 2/1954 | Schmidt | 83/4 |
| 2,678,693 | 5/1954 | Kusiv | 83/418 |
| 2,923,194 | 2/1960 | Ambler et al. | 83/440 X |
| 3,112,780 | 12/1963 | Lecrone | 83/4 |
| 3,255,650 | 6/1966 | Simmons | 83/441 X |
| 3,911,769 | 10/1975 | Lecrone | 83/4 |

Primary Examiner—Frank T. Yost
Attorney, Agent, or Firm—Thomas Hooker

[57] ABSTRACT

A bakery product slicer and method for forming vertical slits extending along proof lines between adjacent buns in clusters of buns. The slicer includes a rotary vertical slicing blade located in the path of movement of clusters past the slicer at the nominal location of the proof line and a fixed aligner having a heel portion with a curved bow and divergent flanks located upstream of the blade with plates extending from the heel portion to either side of the blade and beyond the downstream edge of the blade so the blade is fitted in a slot between the plates. As clusters are moved toward the aligner the open crease above the proof line is moved adjacent the heel portion of the aligner so that the flanks engage the buns and assure that the proof line between the buns is held in alignment with the fixed blade so that the vertical slit extends along the actual proof line.

12 Claims, 7 Drawing Figures

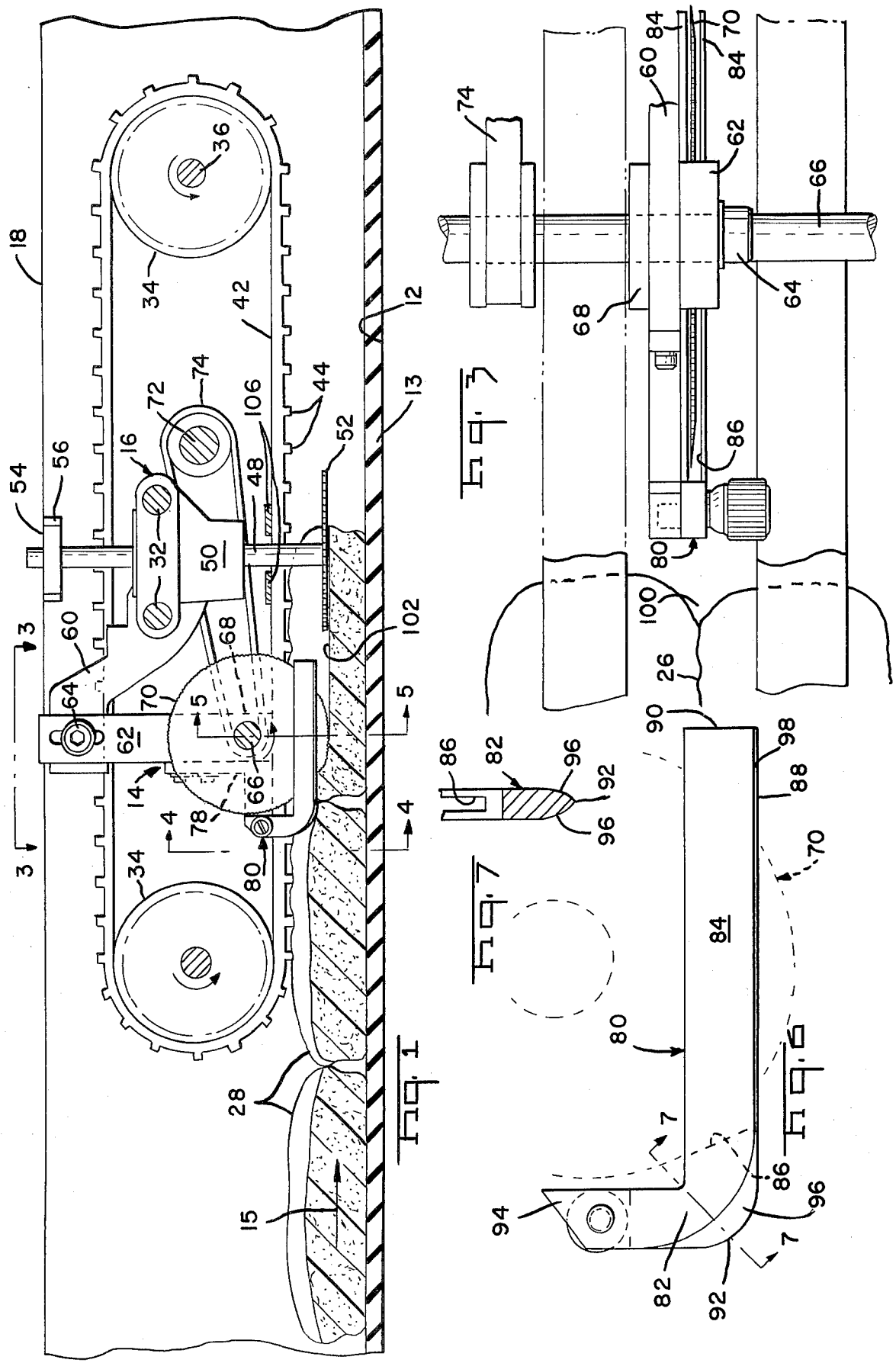

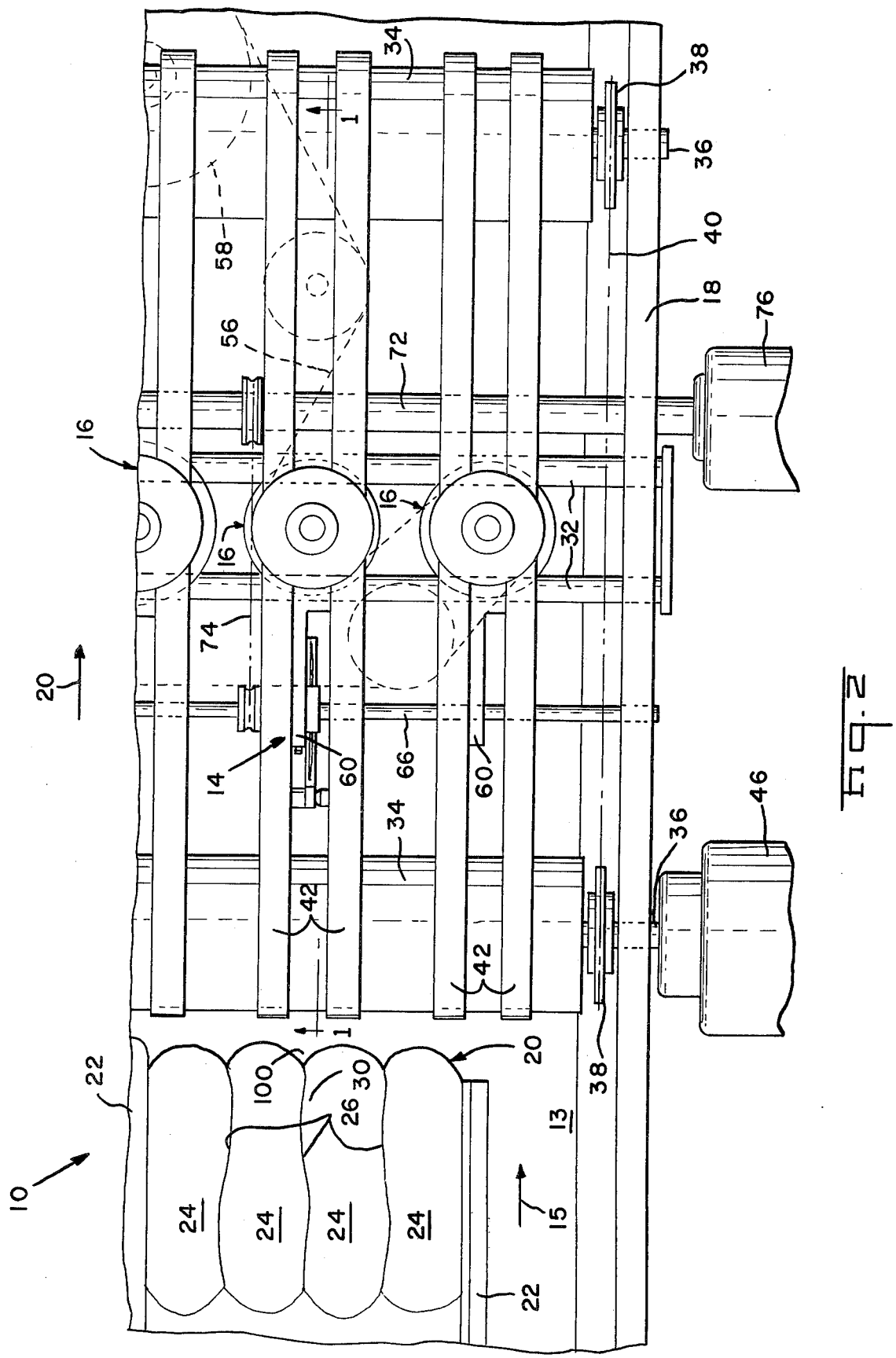

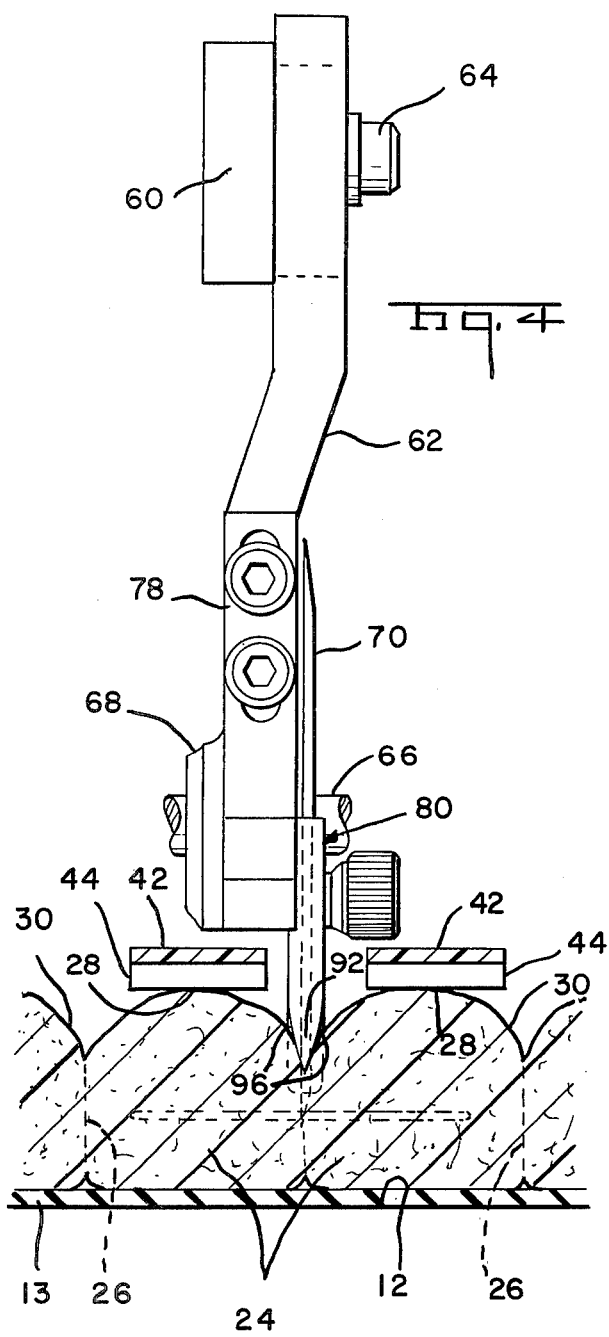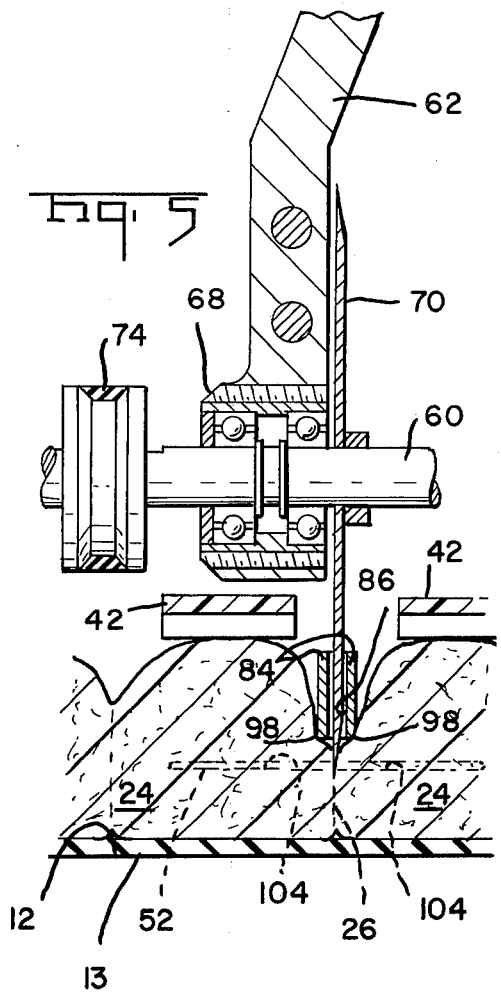

BAKERY PRODUCT SLICER

The invention relates to a bakery product slicer and method for forming vertical slits extending along irregular proof lines in bakery product clusters, particularly clusters of hot dog buns.

Hot dog buns are baked in clusters or groups of individual buns secured together at irregular proof lines between adjacent buns. Each cluster is formed from portions of dough which are placed on a pan and proofed before baking so that the portions rise and contact each other along an irregular surface extending along the length of the buns. The surface of contact is called the proof line. The adjacent buns in the cluster are held together at the proof lines but are easily broken apart along the proof lines.

The baked clusters of buns are sliced to form horizontal slits or pockets for use in holding hot dogs. The slits are conventionally formed by rotary slicing blades. While horizontal slits are easily formed in the end buns of a cluster, formation of horizontal slits in the middle buns of a cluster has presented difficulties to the industry, primarily because of a necessity of forming a vertical slit between the adjacent buns for reception of the vertical shaft supporting the horizontal rotary slicing blade used to form the horizontal slits in the middle buns. The vertical shaft is fixed on the slicer in alignment with the nominal location of the proof line between the adjacent buns, that is the axis of the vertical shaft is located equidistant between the buns so that if the proof line were a plane located equidistant between the buns, the axis of the shaft would move along the plane during the formation of the horizontal slits.

Heretofore, hot dog bun slicers have used fixed vertical rotary slicing blades for cutting the vertical slit between adjacent buns through which the vertical shaft carrying the horizontal slicing blade moves during cutting of the horizontal slits or pockets. The vertical slicing blade is located immediately upstream of the axis of the vertical shaft with the result that the vertical slit formed by the fixed blade is formed along the nominal proof line, not the actual proof line which in almost all cases is offset from the nominal proof line. The result is an unsightly product having reduced customer appeal. Slivers are sliced from buns which extend across the nominal proof line, tend to break away from the adjacent buns during slicing and may wrap around the vertical shaft of the horizontal slicer, resulting in injury to the buns moving through the slicer and requiring that the slicer be stopped and cleared.

The improved slicer of the present invention includes conventional fixed vertical and horizontal slicing blades with the axis of the shaft supporting the vertical slicing blade and the horizontal slicing blade positioned on the nominal proof line of the cluster to be sliced and with a fixed aligner secured to the slicer including a heel portion located upstream of the vertical slicing blade and positioned in the downstream path of the cluster so that the bow and divergent flanks of the heel portion engage the sides of the buns at the crease above the proof line and shift the resilient buns laterally sufficiently to move the proof line into alignment with the vertical blade. A pair of plates extend downstream from the heel portion to either side of the vertical slicing blade past the downstream edge of the blade to define a slot for the blade. The aligner holds the buns apart to assist in opening the crease for reception of the vertical slicing blade, and, at the same time, reduces frictional engagement between the buns and the aligner and blade. The vertical shaft of the horizontal slicer follows in the slit formed by the vertical slicer at the proof line to cut the horizontal slits or hot dog pockets.

Other objects and features of the invention will become apparent as the description proceeds, especially when taken in conjunction with the accompanying drawings illustrating the invention, of which are three sheets.

IN THE DRAWINGS

FIG. 1 is a vertical sectional view taken through a bakery product slicer according to the invention generally along line 1—1 of FIG. 2;

FIG. 2 is a partially broken away top view of the bakery product slicer of FIG. 1;

FIG. 3 is an enlarged top view of the slicer taken aling line 3—3 of FIG. 1;

FIGS. 4 and 5 are sectional views taken respectively along lines 4—4 and 5—5 of FIG. 1;

FIG. 6 is a side view of the aligner used for the vertical slicing blade; and

FIG. 7 is a sectional view taken along line 7—7 of FIG. 6.

Bakery product slicer 10 is similar to the slicer shown in Schmidt et al U.S. Pat. No. 2,811,997 and includes a support surface 12 extending beneath vertical and horizontal slicing units 14 and 16 which are arranged in pairs across the width of the slicer between side rails 18. Individual units 16 are located between the pairs of units. A continuous conveyor belt 13 extends across the width of support surface 12 and is moved downstream by a suitable drive to carry the hot dog bun clusters 20 past units 14 and 16 in the direction of arrow 15. Upstream guides 22 orient the clusters for downstream movement past the units. The clusters 20 include four hot dog buns 24 which are baked together from individual portions of dough and are secured together at irregular proof lines 26. As illustrated in FIG. 4, buns include crests 28 which slope downwardly toward the proof lines 26 to form creases 30 immediately above the proof lines.

The vertical and horizontal slicing units 14 and 16 are mounted on a pair of support rods 32 which extend between rails 18. Cylindrical belt rollers 34 are located upstream and downstream of the slicing units and are supported on shafts 36 journaled in bearings in rails 18. Shafts 36 carry sprocket gears 38 which are linked together by chain 40. A pair of feed belts 42 extend around the rollers 34 to either side of each pair of slicing units and of each individual horizontal slicing unit. The belts carry teeth 44 which engage the crests 28 of the buns as the clusters are moved downstream. Drive motor 46, or other suitable drive means, rotates one of the shafts 36 so that the rollers are rotated in a counter-clockwise direction as viewed in FIG. 1 and the lower runs of the belts 42 move downstream over surface 12 at the same speed as belt 13. The teeth 44 engage the crests 28 of the buns in clusters 20 and cooperate with belt 13 to move the clusters downstream past the vertical and horizontal slicing units.

Each horizontal slicing unit 16 includes a vertical shaft 48 journaled in bearings in block 50 carried by support rods 32. A circular horizontal slicing blade 52 is secured to the lower end of shaft 48 a distance above belt 13. Drive pulley 54 is mounted on the end of the shaft 48 above the upper runs of belts 42. Drive belt 56 is wrapped around the pulleys 54 of the various horizontal slicing units 16, suitable idlers and a drive pulley 58 which is rotated by a suitable drive motor or other drive means, as desired. Rotation of the drive motor and pulley 58 rotates the horizontal slicing blades 52 at a high cutting speed. Support arms 60 extend from blocks 50 up between the belts 42 located to either side of the horizontal slicing unit.

The vertical slicing units 14 are supported by arms 60 and each includes a vertical support bar 62 secured to arm 60 by bolt 64 and extending downward therefrom between the upper runs of the adjacent pair of belts 42. A drive shaft 66 extends between the side rails 18 and is journaled in bearings carried by the bars and by the lower ends 68 of bars 62. A vertically oriented circular slicing blade 70 is mounted on shaft 66 immediately upstream of the axis of the vertical shaft 48 of the adjacent horizontal slicing unit 16 with the minimum spacing between the vertical slicing blade and belt 13 being slightly less than the distance between the belt and the horizontal slicing blade 52. A second shaft 72 extends across surface 12 and is journaled in bearings in side rails 18 downstream of shaft 66. The shafts 66 and 72 are connected together by belt 74 which extends around pulleys carried by the shafts so that counter-clockwise rotation of shaft 72, as viewed in FIG. 1, by drive motor 76, or other suitable drive means, rotates shaft 66 in a counter-clockwise direction at a suitable high speed to drive the vertical slicing blade 70 carried by the shaft.

L-shaped mounting bracket 78 is bolted to the upstream side of bar 62 and includes an end extending upstream beyond the edge of blade 70. A proof line aligner 80 is bolted onto the upstream end of the bracket 78 immediately upstream of the vertical slicing blade 70. See FIG. 3. The aligner 80 includes an aligning heel portion 82 and a pair of spaced plates 84 defining a blade-receiving slot 86 therebetween. The plates 84 extend from the heel portion in a downstream direction on either side of the vertical slicing blade 70, past shaft 66 and a short distance beyond the downstream edge of the blade. The lower surfaces 88 of the plates parallel surface 12 and are spaced slightly further from the surface than the horizontal blade 52. Blade 70 extends below the plates a distance equal to the depth of the vertical slits in the clusters 20. Blade 70 rotates freely in slot 86. As illustrated in FIGS. 1 and 6, the free downstream ends 90 of plates 84 extend beyond the downstream circumference of the blade 70 so that the cutting edges of the blade sweeping away from tnhe vertical slit in the cluster are protedted by the plate to reduce injury to the buns. Ends 90 are not joined.

The thickness of the upstream and bottom edges of the aligner increases away from curved bow 92 extending downwardly from the upstream edge of the vertical leg 94 of the aligner, around the heel portion and to the lower edge of the aligner adjacent the plates 84. Divergent convex flanks 96 extend from bow 92 to the sides of the aligner and are crescent-shaped when viewed from the side as illustrated in FIGS. 1 and 6. The lower corners 98 of plates 84 outwardly of the blade 70 are rounded and form extensions of the flanks 96. See FIGS. 5 and 6.

The operation of the bakery product slicer 10 will now be described in detail. Hot dog clusters 20 having four buns are moved down conveyor belt 13 on surface 12 between guides 22 so that the nominal location of the central proof line 26 is immediately upstream of the vertical slicing blade 70 of unit 14 and the axis of the vertical shaft 48 of unit 16. As the cluster leaves the guides 22 the crests 28 of the individual hot dog buns move into engagement with the teeth 44 of belts 42 and are compressed slightly by the belts as illustrated in FIG. 1. The lower runs of the belts 42 move downstream at the same speed as belt 13. Downstream movement of the cluster between belts 13 and 42 moves the cluster toward the aligner 80 so that the divergent end 100 of the crease 30 between the middle two buns 24 is moved adjacent heel portion 82. The rounded walls of crease 30 between the buns engage the bow 92 and smooth flanks 96 with the result that if the actual proof line 26 between the buns is not on the nominal proof line, the side of the bun nearest the nominal proof line engages the adjacent flank of the aligner and is compressed and moved away from the aligner so that the sides of the buns at the crease conform to the aligner and the actual proof line is brought into alignment with the nominal proof line and the exposed portion of blade 70 extending below plates 84. The corners 98 of the plates ride along and open the crease for reception of the blade 70 as it cuts vertical slit 102 thereby reducing the area of engagement between the non-cut surfaces of the buns and both the aligner and sides of the blade. In this way crumbling and scoring of the buns is reduced. The plates extend past the downstream edge of the blade to protect the buns from the teeth on the blade moving out of the vertical slit.

In some cases the height of the proof line between the center two buns may be greater than the minimum distance between the aligner 80 and conveyor 13. In this event, the aligner may compress the buns at the proof line somewhat or, alternatively, may separate the buns slightly at the weakened proof line.

Continued downstream movement of the cluster 20 brings it into engagement with horizontal blade 52 of the unit 16 located downstream from the vertical slicing unit 14 and also the horizontal knives of the two adjacent units 16. See FIG. 2. Shaft 48 follows in the vertical slit 102 without injury to the middle two buns so that the knife 52 carried thereby cuts horizontal slits or hot dog pockets 104 in each of the two buns. The horizontal blades of the adjacent two units 16 cut line horizontal slits or hot dog-receiving pockets in the outer two buns of the cluster. The vertical shafts of these units are located laterally of the cluster. Hold down plates 106 extend across the upper surfaces of the lower runs of belts 42 above the horizontal blades 52 to assure that the belts firmly engage the crests of the buns as the buns are moved past the blades and the horizontal slits are cut in them. The sliced clusters are carried downstream of the slicing units by belts 13 and 42 and discharged from the slicer.

Frictional forces between the aligner and the central two rolls in the cluster is reduced by the geometry of heel portion 82. The bow 92 and divergent flanks 96 present rounded and smooth surfaces to the buns as they are moved toward the horizontal slicing unit 14. As the clusters move toward the aligner, the buns first engage the heel portion 82. Because flanks 96 diverge to either side of the bow 92 the width of the aligner increases both downstream and vertically from the bow so that the crease between the buns is gradually and smoothly opened as the buns move past the heel portion 82 with minimum frictional engagement between the aligner and the sides of the buns. In order to further reduce friction between the aligner and the sides of the buns the surfaces of the aligner which engage the buns are polished. The rounded corners 98 on the lower surfaces of the plates 84 further reduce friction and decrease the possibility that the corners cut the buns. The flanks 96 are located immediately upstream of vertical blade 90 to reduce the area of engagement between the bun and aligners.

Plates 94 extend downstream a short distance beyond blade 70 in order to protect the bun from injury by the downstream cutting edge of the blade as it moves out of slit 102. Extension of the plates further downstream toward the vertical shaft 48 is undesirable as it increases the frictional forces between the plates and the buns thereby increasing the possibility that the buns on either side of the aligner would roll up into undesired and unsightly dough balls which could collect on the vertical shaft 48 with greater resultant injury to the buns.

The plates 94 are not joined downstream of the blade 70 to assure that the adjacent sides of the buns or crumbs produced during cutting of the vertical slit 102 do not hang up or collect in slot 86 thereby injuring the buns. The open downstream end of the slot facilitates ejection of crumbs drawn into the slot during normal cutting of slits 102 in successive clusters 28.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A bakery product slicer for forming slits in clusters of buns or the like as they are moved on a surface downstream past the slicer; the slicer including a support above the surface; a horizontal slicing unit on the support having a vertical rotary shaft journaled in and held by the support and a horizontal rotary cutting blade at the lower end of the shaft; and a vertical slicing unit on the support located upstream from the horizontal slicing unit and including a horizontal rotary shaft journaled in and held by the support upstream of the vertical rotary shaft and a vertical rotary cutting blade on the horizontal rotary shaft located directly upstream of the vertical rotary shaft; and drive means for rotating the shafts and blades; the cutting edge of the horizontal cutting blade being located approximately the same distance from the surface as the minimum distance from the surface to the cutting edge of the vertical cutting blade; wherein the improvement comprises a fixed proof-line aligner carried by the support and including an aligning heel portion located immediately upstream of the vertical cutting blade and a pair of spaced plates extending downstream from the heel portion on either side of and past the downstream edge of the vertical cutting blade, such blade extending a distance below the bottom edges of the plates whereby upon movement of a cluster of buns on the surface downstream toward the slicing units the crease above the proof line of adjacent buns moves past the aligners to align the proof line with the vertical cutting blade so that further downstream movement of the cluster of buns moves the proof line past the exposed portion of the vertical cutting blade to form a vertical slit at the Proof line, the vertical rotary shaft following in such slit as the horizontal cutting blade forms horizontal slits in the buns.

2. A bakery product slicer as in claim 1 wherein the heel portion includes a bow and flanks on either side of the bow, the flanks diverging from the bow in a downstream direction to the sides of the aligner.

3. A bakery product slicer as in claim 2 wherein said flanks diverge from the bow in a direction away from the surface.

4. A bakery product slicer as in claim 2 wherein the bottom edges of the plates parallel the surface.

5. A bakery product slicer as in claim 2 wherein said plates are free of each other downstream of the vertical rotary cutting blade.

6. A bakery product slicer as in claim 2 wherein said bow extends in a curve from the upstream edge of the aligner around the heel portion to the lower edge of the aligner, said flanks also diverging in a direction away from the surface.

7. A bakery product slicer as in claim 6 wherein said plates are free of each other downstream of the vertical rotary cutting blade, the bottom edges of the plates parallel the surface, and the lower corners of the plates are rounded extensions of said flanks.

8. A bakery product slicer as in claim 7 wherein said flanks are crescent shaped.

9. A bakery product slicer for forming slits in clusters of buns or the like as they are moved on a surface downstream past the slicer; the slicer including a support above the surface; a horizontal slicing unit on the support having a horizontal cutting blade secured to the support by an upwardly extending member; and a vertical slicing unit on the support located upstream of the horizontal slicing unit and including a vertical cutting blade located directly upstream of the member; and blade drive means for imparting a cutting motion to the vertical cutting blade; wherein the improvement comprises a fixed proof line aligner carried by the support and including aligning portion located immediately upstream of the vertical cutting blade and a pair of spaced side plates extending downstream from the aligning portion on either side of the vertical cutting blade, such blade extending a distance below the bottom edges of the side plates whereby upon movement of a cluster of buns on the surface downstream past the slicing units the aligner enters the crease above the proof line of adjacent buns to align the proof line with the vertical cutting blade so that further downstream movement of the cluster of buns moves the proof line past the exposed portion of the vertical cutting blade to form a vertical slit at the proof line, the member following in such slit as the horizontal cutting blade forms horizontal slits in the buns.

10. A bakery product slicer as in claim 9 wherein the aligning portion includes a rounded bow and flanks on either side of the bow, the flanks diverging from the bow in a downstream direction to the sides of the aligner.

11. A bakery product slicer as in claim 9 wherein said bow extends from the upstream edge of the aligner around the aligning portion to the lower edge of the aligner, said plates extend downstream past the vertical cutting blade and are free of each other downstream of the vertical cutting blade and the bottom edges of the plates are generally parallel to the surface.

12. A bakery product slicer as in claim 11 wherein the lower corners of the plates are rounded extensions of the flanks.

* * * * *